US008319658B2

(12) United States Patent
Conant et al.

(10) Patent No.: US 8,319,658 B2
(45) Date of Patent: Nov. 27, 2012

(54) PROCESS, DEVICE AND SYSTEM FOR MAPPING TRANSFORMERS TO METERS AND LOCATING NON-TECHNICAL LINE LOSSES

(75) Inventors: Rob Conant, Oakland, CA (US); Chris Prince, Roswell, GA (US)

(73) Assignee: Trilliant Networks, Inc., Redwood City, CA (US)

( * ) Notice: Subject to any disclaimer, the term of this patent is extended or adjusted under 35 U.S.C. 154(b) by 399 days.

(21) Appl. No.: 12/721,948

(22) Filed: Mar. 11, 2010

(65) Prior Publication Data

US 2010/0231413 A1 Sep. 16, 2010

Related U.S. Application Data

(60) Provisional application No. 61/159,202, filed on Mar. 11, 2009.

(51) Int. Cl.
*G08B 23/00* (2006.01)
*G08C 15/06* (2006.01)

(52) U.S. Cl. .............................. 340/870.02; 340/870.01

(58) Field of Classification Search ............ 340/870.02, 340/870.01, 870.03
See application file for complete search history.

(56) References Cited

U.S. PATENT DOCUMENTS

| 4,132,981 A | 1/1979 | White ........................... 340/203 |
| 4,190,800 A | 2/1980 | Kelly, Jr. et al. ................ 325/37 |
| 4,204,195 A | 5/1980 | Bogacki ........................ 340/151 |
| 4,254,472 A | 3/1981 | Juengel et al. ................ 364/900 |
| 4,322,842 A | 3/1982 | Martinez ........................ 370/11 |
| 4,396,915 A | 8/1983 | Farnsworth et al. ..... 340/870.03 |
| 4,425,628 A | 1/1984 | Bedard et al. ................. 364/900 |
| 4,638,314 A | 1/1987 | Keller ...................... 340/870.02 |
| 4,644,320 A | 2/1987 | Carr et al. ................... 340/12.37 |
| 4,749,992 A | 6/1988 | Fitzemeyer et al. ..... 340/870.02 |
| 4,792,946 A | 12/1988 | Mayo ............................ 370/245 |
| 4,939,726 A | 7/1990 | Flammer et al. ............. 370/400 |
| 5,007,052 A | 4/1991 | Flammer ..................... 370/389 |

(Continued)

FOREIGN PATENT DOCUMENTS

EP 0 578 041 B1 11/1999

(Continued)

OTHER PUBLICATIONS

Hydro One Networks, Inc., Request for Proposal for Smart Metering Services, 16 pp., Mar. 4, 2005.

(Continued)

*Primary Examiner* — Peguy Jean Pierre
(74) *Attorney, Agent, or Firm* — Dawn-Marie Bey; King & Spalding LLP

(57) ABSTRACT

A process, device and system for mapping usage data from a plurality of utility usage nodes, such as electricity usage meters, to one or more utility distribution nodes, such as a transformer, in which utility usage data collected at a collection device from the plurality of utility usage nodes at predetermined intervals is received, and utility distribution data collected at the collection device from the utility distribution node at the predetermined intervals is likewise received. Aggregate usage data from one or more of the plurality of utility usage nodes is compared to distribution data from the utility distribution node during one or more of the same predetermined intervals to determine, using a computer, which of the plurality of utility usage nodes is connected to the utility distribution node.

25 Claims, 4 Drawing Sheets

U.S. PATENT DOCUMENTS

| | | | | |
|---|---|---|---|---|
| 5,056,107 A | 10/1991 | Johnson et al. | ............... | 375/138 |
| 5,077,753 A | 12/1991 | Grau, Jr. et al. | ............... | 375/141 |
| 5,079,768 A | 1/1992 | Flammer | ...................... | 370/349 |
| 5,115,433 A | 5/1992 | Baran et al. | .................... | 370/400 |
| 5,117,422 A | 5/1992 | Hauptschein et al. | ........ | 370/255 |
| 5,130,987 A | 7/1992 | Flammer | ...................... | 370/436 |
| 5,138,615 A | 8/1992 | Lamport et al. | ............. | 370/94.3 |
| 5,159,592 A | 10/1992 | Perkins | ........................ | 370/338 |
| 5,216,623 A | 6/1993 | Barrett et al. | .................... | 364/550 |
| 5,276,680 A | 1/1994 | Messenger | ................... | 370/311 |
| 5,311,581 A | 5/1994 | Merriam et al. | ......... | 379/106.07 |
| 5,400,338 A | 3/1995 | Flammer, III et al. | ........ | 370/255 |
| 5,430,729 A | 7/1995 | Rahnema | ...................... | 370/409 |
| 5,432,507 A | 7/1995 | Mussino et al. | ......... | 340/870.03 |
| 5,453,977 A | 9/1995 | Flammer, III et al. | ........ | 370/254 |
| 5,459,727 A | 10/1995 | Vannucci | ...................... | 370/332 |
| 5,463,777 A | 10/1995 | Bialkowski et al. | ................. | 1/1 |
| 5,465,398 A | 11/1995 | Flammer | ......................... | 455/69 |
| 5,467,345 A | 11/1995 | Cutler, Jr. et al. | ............. | 370/229 |
| 5,471,469 A | 11/1995 | Flammer, III et al. | ........ | 370/346 |
| 5,479,400 A | 12/1995 | Dilworth et al. | ............. | 370/331 |
| 5,488,608 A | 1/1996 | Flammer, III | ................ | 370/400 |
| 5,515,369 A | 5/1996 | Flammer, III et al. | ........ | 370/480 |
| 5,515,509 A | 5/1996 | Rom | ............................ | 709/228 |
| 5,528,507 A | 6/1996 | McNamara et al. | .......... | 700/286 |
| 5,544,036 A | 8/1996 | Brown, Jr. et al. | ............. | 364/145 |
| 5,553,094 A | 9/1996 | Johnson et al. | ............... | 375/130 |
| 5,570,084 A | 10/1996 | Retter et al. | .................. | 370/338 |
| 5,572,528 A | 11/1996 | Shuen | ........................... | 370/402 |
| 5,596,722 A | 1/1997 | Rahnema | ....................... | 709/241 |
| 5,608,721 A | 3/1997 | Natarajan et al. | ............. | 370/238 |
| 5,608,780 A | 3/1997 | Gerszberg et al. | ............ | 455/436 |
| 5,623,495 A | 4/1997 | Eng et al. | ....................... | 370/397 |
| 5,659,300 A | 8/1997 | Dresselhuys et al. | .... | 340/870.02 |
| 5,673,252 A | 9/1997 | Johnson et al. | ............... | 370/449 |
| 5,696,501 A | 12/1997 | Ouellette et al. | ......... | 340/870.02 |
| 5,717,718 A | 2/1998 | Rowsell et al. | ................. | 375/260 |
| 5,719,564 A | 2/1998 | Sears | ........................ | 340/870.02 |
| 5,726,644 A | 3/1998 | Jednacz et al. | ........... | 340/825.52 |
| 5,727,057 A | 3/1998 | Emery et al. | ............. | 379/201.07 |
| 5,737,318 A | 4/1998 | Melnik | ........................ | 370/254 |
| 5,740,366 A | 4/1998 | Mahany et al. | .............. | 709/227 |
| 5,748,104 A | 5/1998 | Argyroudis et al. | ..... | 340/870.11 |
| 5,757,783 A | 5/1998 | Eng et al. | ....................... | 370/315 |
| 5,758,331 A | 5/1998 | Johnson | ........................ | 705/412 |
| 5,761,083 A | 6/1998 | Brown, Jr. et al. | ............ | 364/492 |
| 5,767,790 A | 6/1998 | Jovellana | ................ | 340/870.02 |
| 5,774,660 A | 6/1998 | Brendel et al. | ................ | 709/201 |
| 5,812,531 A | 9/1998 | Cheung et al. | ................ | 370/255 |
| 5,822,309 A | 10/1998 | Ayanoglu et al. | ............. | 370/315 |
| 5,844,893 A | 12/1998 | Gollnick et al. | ............. | 370/329 |
| 5,874,903 A | 2/1999 | Shuey et al. | ............. | 340/870.02 |
| 5,880,677 A | 3/1999 | Lestician | ................ | 340/825.06 |
| 5,892,758 A | 4/1999 | Argyroudis | .................. | 370/335 |
| 5,894,422 A | 4/1999 | Chasek | ................. | 364/528.26 |
| 5,896,097 A | 4/1999 | Cardozo | ................ | 340/870.03 |
| 5,898,387 A | 4/1999 | Davis et al. | ............. | 340/870.02 |
| 5,898,826 A | 4/1999 | Pierce et al. | ........................ | 714/4 |
| 5,901,067 A | 5/1999 | Kao et al. | ........................ | 700/11 |
| 5,903,566 A | 5/1999 | Flammer, III | ................ | 370/406 |
| 5,914,672 A | 6/1999 | Glorioso et al. | .......... | 340/870.02 |
| 5,914,673 A | 6/1999 | Jennings et al. | .......... | 340/870.03 |
| 5,920,697 A | 7/1999 | Masters et al. | ................ | 709/219 |
| 5,926,531 A | 7/1999 | Petite | ........................ | 379/144.04 |
| 5,933,092 A | 8/1999 | Ouellette et al. | .......... | 340/870.02 |
| 5,953,371 A | 9/1999 | Rowsell et al. | ............... | 375/220 |
| 5,963,146 A | 10/1999 | Johnson et al. | ............ | 340/870.01 |
| 5,963,457 A | 10/1999 | Kanoi et al. | ............. | 364/528.26 |
| 5,974,236 A | 10/1999 | Sherman | ...................... | 709/221 |
| 5,986,574 A | 11/1999 | Colton | ..................... | 340/870.02 |
| 5,987,011 A | 11/1999 | Toh | ............................... | 370/331 |
| 5,991,806 A | 11/1999 | McHann, Jr. | ................... | 709/224 |
| 6,014,089 A | 1/2000 | Tracy et al. | ............. | 340/870.02 |
| 6,018,659 A | 1/2000 | Ayyagari et al. | ............. | 455/431 |
| 6,026,133 A | 2/2000 | Sokoler | ......................... | 375/365 |
| 6,028,522 A | 2/2000 | Petite | ........................... | 340/641 |
| 6,044,062 A | 3/2000 | Brownrigg et al. | ............ | 370/238 |
| 6,058,355 A | 5/2000 | Ahmed et al. | ................. | 702/62 |
| 6,061,609 A | 5/2000 | Kanoi et al. | ................... | 700/291 |
| 6,073,169 A | 6/2000 | Shuey et al. | ................... | 709/217 |
| 6,075,777 A | 6/2000 | Agrawal et al. | ............... | 370/329 |
| 6,078,785 A | 6/2000 | Bush | ............................... | 455/7 |
| 6,084,867 A | 7/2000 | Meier | ........................... | 370/338 |
| 6,088,659 A | 7/2000 | Kelley et al. | ..................... | 702/62 |
| 6,097,703 A | 8/2000 | Larsen et al. | ................. | 370/254 |
| 6,108,699 A | 8/2000 | Moiin | ........................... | 709/221 |
| 6,118,269 A | 9/2000 | Davis | ............................ | 324/110 |
| 6,122,603 A | 9/2000 | Budike, Jr. | ..................... | 702/182 |
| 6,124,806 A | 9/2000 | Cunningham et al. | ... | 340/870.02 |
| 6,134,587 A | 10/2000 | Okanoue | ........................ | 709/222 |
| 6,137,423 A | 10/2000 | Glorioso et al. | ......... | 340/870.02 |
| 6,150,955 A | 11/2000 | Tracy et al. | .............. | 340/870.02 |
| 6,169,979 B1 | 1/2001 | Johnson | ........................ | 705/412 |
| 6,172,616 B1 | 1/2001 | Johnson et al. | .......... | 340/870.12 |
| 6,195,018 B1 | 2/2001 | Ragle et al. | .............. | 340/870.01 |
| 6,218,953 B1 | 4/2001 | Petite | ........................... | 340/641 |
| 6,233,327 B1 | 5/2001 | Petite | ........................... | 379/155 |
| 6,239,722 B1 | 5/2001 | Colton et al. | ............. | 340/870.02 |
| 6,240,080 B1 | 5/2001 | Okanoue et al. | ............... | 370/338 |
| 6,246,677 B1 | 6/2001 | Nap et al. | ....................... | 370/346 |
| 6,246,689 B1 | 6/2001 | Shavitt | .......................... | 370/406 |
| 6,249,516 B1 | 6/2001 | Brownrigg et al. | ........... | 370/338 |
| 6,298,053 B1 | 10/2001 | Flammer, III et al. | ........ | 370/349 |
| 6,300,881 B1 | 10/2001 | Yee et al. | ................. | 340/870.02 |
| 6,304,556 B1 | 10/2001 | Haas | ............................. | 370/254 |
| 6,311,105 B1 | 10/2001 | Budike, Jr. | ..................... | 700/291 |
| 6,338,087 B1 | 1/2002 | Okanoue | ........................ | 709/222 |
| 6,362,745 B1 | 3/2002 | Davis | ............................ | 340/637 |
| 6,363,057 B1 | 3/2002 | Ardalan et al. | ................. | 370/252 |
| 6,366,217 B1 | 4/2002 | Cunningham et al. | ... | 340/870.31 |
| 6,369,719 B1 | 4/2002 | Tracy et al. | .............. | 340/870.02 |
| 6,369,769 B1 | 4/2002 | Nap et al. | ....................... | 343/719 |
| 6,373,399 B1 | 4/2002 | Johnson et al. | ............ | 340/870.11 |
| 6,396,839 B1 | 5/2002 | Ardalan et al. | ................. | 370/401 |
| 6,400,949 B1 | 6/2002 | Bielefeld et al. | ............... | 455/434 |
| 6,407,991 B1 | 6/2002 | Meier | ........................... | 370/338 |
| 6,415,330 B1 | 7/2002 | Okanoue | ........................ | 709/245 |
| 6,430,268 B1 | 8/2002 | Petite | ........................... | 379/39 |
| 6,437,692 B1 | 8/2002 | Petite et al. | ................... | 340/540 |
| 6,457,054 B1 | 9/2002 | Bakshi | .......................... | 709/227 |
| 6,480,497 B1 | 11/2002 | Flammer, III et al. | ........ | 370/400 |
| 6,480,505 B1 | 11/2002 | Johansson et al. | ............. | 370/449 |
| 6,492,910 B1 | 12/2002 | Ragle et al. | .............. | 340/870.02 |
| 6,509,841 B1 | 1/2003 | Colton et al. | ............. | 340/870.11 |
| 6,522,974 B2 | 2/2003 | Sitton | ............................ | 702/17 |
| 6,535,498 B1 | 3/2003 | Larsson et al. | ................. | 370/338 |
| 6,538,577 B1 | 3/2003 | Ehrke et al. | .............. | 340/870.02 |
| 6,553,355 B1 | 4/2003 | Arnoux et al. | .................... | 706/13 |
| 6,577,671 B1 | 6/2003 | Vimpari | ........................ | 375/146 |
| 6,606,708 B1 | 8/2003 | Devine et al. | ..................... | 726/8 |
| 6,618,578 B1 | 9/2003 | Petite | ............................ | 455/92 |
| 6,618,772 B1 | 9/2003 | Kao et al. | ........................ | 710/15 |
| 6,628,764 B1 | 9/2003 | Petite | ........................ | 379/106.01 |
| 6,633,823 B2 | 10/2003 | Bartone et al. | ................... | 702/57 |
| 6,636,894 B1 | 10/2003 | Short et al. | ..................... | 709/225 |
| 6,650,249 B2 | 11/2003 | Meyer et al. | .............. | 340/870.28 |
| 6,653,945 B2 | 11/2003 | Johnson et al. | ........... | 340/870.02 |
| 6,657,552 B2 | 12/2003 | Belski et al. | .............. | 340/870.02 |
| 6,665,620 B1 | 12/2003 | Burns et al. | ..................... | 702/62 |
| 6,671,635 B1 | 12/2003 | Forth et al. | ...................... | 702/61 |
| 6,681,110 B1 | 1/2004 | Crookham et al. | ........... | 455/420 |
| 6,681,154 B2 | 1/2004 | Nierlich et al. | ............... | 700/286 |
| 6,684,245 B1 | 1/2004 | Shuey et al. | ................... | 709/223 |
| 6,691,173 B2 | 2/2004 | Morris et al. | ................... | 709/249 |
| 6,697,331 B1 | 2/2004 | Riihinen et al. | ............... | 370/236 |
| 6,710,721 B1 | 3/2004 | Holowick | ............. | 340/870.02 |
| 6,711,166 B1 | 3/2004 | Amir et al. | ................... | 370/395.1 |
| 6,711,409 B1 | 3/2004 | Zavgren, Jr. et al. | ......... | 455/445 |
| 6,714,787 B2 | 3/2004 | Reed et al. | ..................... | 455/445 |
| 6,718,137 B1 | 4/2004 | Chin | ................................ | 398/3 |
| 6,725,281 B1 | 4/2004 | Zintel et al. | ..................... | 719/318 |
| 6,728,514 B2 | 4/2004 | Bandeira et al. | .............. | 455/13.1 |
| 6,747,557 B1 | 6/2004 | Petite et al. | ................... | 340/540 |
| 6,747,981 B2 | 6/2004 | Ardalan et al. | ................. | 370/401 |
| 6,751,445 B2 | 6/2004 | Kasperkovitz et al. | ......... | 455/76 |
| 6,751,455 B1 | 6/2004 | Acampora | .................. | 455/414.1 |
| 6,751,672 B1 | 6/2004 | Khalil et al. | .................... | 709/230 |

| | | | |
|---|---|---|---|
| 6,772,052 B1 | 8/2004 | Amundsen et al. ............ 700/291 |
| 6,775,258 B1 | 8/2004 | van Valkenburg et al. ..... 370/338 |
| 6,778,099 B1 | 8/2004 | Mayer et al. ............. 340/870.02 |
| 6,785,592 B1 | 8/2004 | Smith et al. .................... 700/291 |
| 6,798,352 B2 | 9/2004 | Holowick ................ 340/870.02 |
| 6,801,865 B2 | 10/2004 | Gilgenbach et al. ............ 702/61 |
| 6,826,620 B1 | 11/2004 | Mawhinney et al. ......... 709/235 |
| 6,829,216 B1 | 12/2004 | Nakata ............................ 370/228 |
| 6,829,347 B1 | 12/2004 | Odiaka ..................... 379/220.01 |
| 6,831,921 B2 | 12/2004 | Higgins ........................ 370/401 |
| 6,836,737 B2 | 12/2004 | Petite et al. ...................... 702/62 |
| 6,839,775 B1 | 1/2005 | Kao et al. ......................... 710/15 |
| 6,842,706 B1 | 1/2005 | Baraty ............................ 702/61 |
| 6,845,091 B2 | 1/2005 | Ogier et al. ................... 370/338 |
| 6,859,186 B2 | 2/2005 | Lizalek et al. ................ 343/767 |
| 6,865,185 B1 | 3/2005 | Patel et al. .................... 370/412 |
| 6,885,309 B1 | 4/2005 | Van Heteren ............ 340/870.11 |
| 6,891,838 B1 | 5/2005 | Petite et al. ................... 370/401 |
| 6,900,738 B2 | 5/2005 | Crichlow ................. 340/870.02 |
| 6,904,025 B1 | 6/2005 | Madour et al. ............... 370/328 |
| 6,904,385 B1 | 6/2005 | Budike, Jr. ..................... 702/182 |
| 6,909,705 B1 | 6/2005 | Lee et al. ....................... 370/338 |
| 6,914,533 B2 | 7/2005 | Petite ............................ 340/628 |
| 6,914,893 B2 | 7/2005 | Petite ............................ 370/338 |
| 6,946,972 B2 | 9/2005 | Mueller et al. ........... 340/870.02 |
| 6,954,814 B1 | 10/2005 | Leach ........................... 710/305 |
| 6,963,285 B2 | 11/2005 | Fischer et al. ................ 340/635 |
| 6,967,452 B2 | 11/2005 | Aiso et al. ..................... 318/466 |
| 6,970,434 B1 | 11/2005 | Mahany et al. ............... 370/256 |
| 6,970,771 B1 | 11/2005 | Preiss et al. ................... 700/286 |
| 6,975,613 B1 | 12/2005 | Johansson .................... 370/338 |
| 6,980,973 B1 | 12/2005 | Karpenko ..................... 705/412 |
| 6,982,651 B2 | 1/2006 | Fischer .................... 340/870.02 |
| 6,985,087 B2 | 1/2006 | Soliman ................... 340/870.02 |
| 6,995,666 B1 | 2/2006 | Luttrell ....................... 340/539.1 |
| 6,999,441 B2 | 2/2006 | Flammer, III et al. ........ 370/337 |
| 7,009,379 B2 | 3/2006 | Ramirez ....................... 324/142 |
| 7,009,493 B2 | 3/2006 | Howard et al. ................. 340/7.1 |
| 7,010,363 B2 | 3/2006 | Donnelly et al. ................ 700/19 |
| 7,016,336 B2 | 3/2006 | Sorensen ...................... 370/351 |
| 7,020,701 B1 | 3/2006 | Gelvin et al. ................. 709/224 |
| 7,042,368 B2 | 5/2006 | Patterson et al. ......... 340/870.29 |
| 7,046,682 B2 | 5/2006 | Carpenter et al. ............ 370/401 |
| 7,053,767 B2 | 5/2006 | Petite et al. ................... 340/531 |
| 7,054,271 B2 | 5/2006 | Brownrigg et al. ........... 370/238 |
| 7,062,361 B1 | 6/2006 | Lane ............................. 700/295 |
| 7,064,679 B2 | 6/2006 | Ehrke et al. .............. 340/870.02 |
| 7,072,945 B1 | 7/2006 | Nieminen et al. ............ 709/219 |
| 7,079,810 B2 | 7/2006 | Petite et al. ................... 455/41.2 |
| 7,089,089 B2 | 8/2006 | Cumming et al. ............ 700/295 |
| 7,102,533 B2 | 9/2006 | Kim .......................... 340/870.02 |
| 7,103,511 B2 | 9/2006 | Petite ............................ 702/188 |
| 7,106,044 B1 | 9/2006 | Lee, Jr. et al. ................. 324/110 |
| 7,119,713 B2 | 10/2006 | Shuey et al. .............. 340/870.02 |
| 7,126,494 B2 | 10/2006 | Ardalan et al. ........... 340/870.02 |
| 7,135,850 B2 | 11/2006 | Ramirez ....................... 324/142 |
| 7,135,956 B2 | 11/2006 | Bartone et al. ................. 340/3.9 |
| 7,137,550 B1 | 11/2006 | Petite ............................ 235/379 |
| 7,143,204 B1 | 11/2006 | Kao et al. ....................... 710/18 |
| 7,145,474 B2 | 12/2006 | Shuey et al. .............. 340/870.03 |
| 7,170,425 B2 | 1/2007 | Christopher et al. .... 340/870.02 |
| 7,185,131 B2 | 2/2007 | Leach ........................... 710/305 |
| 7,188,003 B2 | 3/2007 | Ransom et al. ............... 700/286 |
| 7,197,046 B1 | 3/2007 | Hariharasubrahmanian . 370/466 |
| 7,200,633 B2 | 4/2007 | Sekiguchi et al. ............ 709/203 |
| 7,209,840 B2 | 4/2007 | Petite et al. ..................... 702/62 |
| 7,215,926 B2 | 5/2007 | Corbett et al. ................ 455/41.2 |
| 7,222,111 B1 | 5/2007 | Budike, Jr. ..................... 705/412 |
| 7,230,544 B2 | 6/2007 | Van Heteren ............ 340/870.03 |
| 7,231,482 B2 | 6/2007 | Leach ........................... 710/305 |
| 7,248,181 B2 | 7/2007 | Patterson et al. ......... 340/870.03 |
| 7,248,861 B2 | 7/2007 | Lazaridis et al. ............. 455/414.1 |
| 7,250,874 B2 | 7/2007 | Mueller et al. ........... 340/870.06 |
| 7,251,570 B2 | 7/2007 | Hancock et al. ............... 702/57 |
| 7,263,073 B2 | 8/2007 | Petite et al. ................... 370/278 |
| 7,271,735 B2 | 9/2007 | Rogai ...................... 340/870.02 |
| 7,274,305 B1 | 9/2007 | Luttrell ..................... 340/870.02 |
| 7,274,975 B2 | 9/2007 | Miller ........................... 700/295 |
| 7,277,027 B2 | 10/2007 | Ehrke et al. .............. 340/870.12 |
| 7,277,967 B2 | 10/2007 | Kao et al. ........................ 710/18 |
| 7,289,887 B2 | 10/2007 | Rodgers ........................ 700/295 |
| 7,295,128 B2 | 11/2007 | Petite ............................ 340/628 |
| 7,301,476 B2 | 11/2007 | Shuey et al. ............. 340/870.03 |
| 7,304,587 B2 | 12/2007 | Boaz ........................ 340/870.02 |
| 7,308,370 B2 | 12/2007 | Mason, Jr. et al. .............. 702/65 |
| 7,312,721 B2 | 12/2007 | Mason, Jr. et al. ....... 340/870.02 |
| 7,315,257 B2 | 1/2008 | Patterson et al. ......... 340/870.02 |
| 7,317,404 B2 | 1/2008 | Cumeralto et al. ........ 340/870.02 |
| 7,321,316 B2 | 1/2008 | Hancock et al. .......... 340/870.02 |
| 7,324,453 B2 | 1/2008 | Wu et al. ....................... 370/238 |
| 7,327,998 B2 | 2/2008 | Kumar et al. .................. 455/405 |
| 7,346,463 B2 | 3/2008 | Petite et al. ..................... 702/62 |
| 7,348,769 B2 | 3/2008 | Ramirez ..................... 324/158.1 |
| 7,349,766 B2 | 3/2008 | Rodgers ........................ 700/295 |
| 7,362,709 B1 | 4/2008 | Hui et al. ...................... 370/237 |
| 7,366,113 B1 | 4/2008 | Chandra et al. .............. 370/255 |
| 7,379,981 B2 | 5/2008 | Elliott et al. .................. 709/220 |
| 7,397,907 B2 | 7/2008 | Petite ............................ 379/155 |
| 7,406,298 B2 | 7/2008 | Luglio et al. ................. 455/90.3 |
| 7,411,964 B2 | 8/2008 | Suemura ....................... 370/400 |
| 7,427,927 B2 | 9/2008 | Borleske et al. .......... 340/870.02 |
| 7,444,640 B2 * | 10/2008 | Partanen ....................... 718/105 |
| 7,451,019 B2 | 11/2008 | Rodgers ........................ 700/295 |
| 7,457,273 B2 | 11/2008 | Nakanishi et al. ............ 370/338 |
| 7,468,661 B2 | 12/2008 | Petite et al. ................... 340/540 |
| 7,487,282 B2 | 2/2009 | Leach ........................... 710/305 |
| 7,495,578 B2 | 2/2009 | Borleske ................... 340/870.02 |
| 7,498,873 B2 | 3/2009 | Opshaug et al. .............. 329/315 |
| 7,505,453 B2 | 3/2009 | Carpenter et al. ............ 370/352 |
| 7,512,234 B2 | 3/2009 | McDonnell et al. .......... 380/247 |
| 7,515,571 B2 | 4/2009 | Kwon et al. ................... 370/338 |
| 7,516,106 B2 | 4/2009 | Ehlers et al. .................. 705/412 |
| 7,522,540 B1 | 4/2009 | Maufer ......................... 370/254 |
| 7,522,639 B1 | 4/2009 | Katz .............................. 370/503 |
| 7,539,151 B2 | 5/2009 | Demirhan et al. ............ 370/254 |
| 7,545,285 B2 | 6/2009 | Shuey et al. ............. 340/870.02 |
| 7,548,826 B2 | 6/2009 | Witter et al. .................. 702/115 |
| 7,548,907 B2 | 6/2009 | Wall et al. ............................ 1/1 |
| 7,554,941 B2 | 6/2009 | Ratiu et al. .................... 370/328 |
| 7,562,024 B2 | 7/2009 | Brooks et al. .................. 705/1.1 |
| 7,586,420 B2 | 9/2009 | Fischer et al. ................ 340/635 |
| 7,599,665 B2 | 10/2009 | Sinivaara ................... 455/67.16 |
| 7,602,747 B2 | 10/2009 | Maksymczuk et al. ....... 370/331 |
| 7,609,673 B2 | 10/2009 | Bergenlid et al. ............. 370/329 |
| 7,613,147 B2 | 11/2009 | Bergenlid et al. ............. 370/329 |
| 7,623,043 B2 | 11/2009 | Mizra et al. .............. 340/870.02 |
| 7,626,967 B2 | 12/2009 | Yarvis et al. .................. 370/338 |
| 7,650,425 B2 | 1/2010 | Davis et al. ................... 709/238 |
| 7,676,231 B2 | 3/2010 | Demirhan et al. ............ 455/452.1 |
| 7,680,041 B2 | 3/2010 | Johansen ...................... 370/230 |
| 7,729,496 B2 | 6/2010 | Hacigumus ................... 380/277 |
| 7,756,538 B2 | 7/2010 | Bonta et al. ................... 455/517 |
| 7,814,322 B2 | 10/2010 | Gurevich et al. ............. 713/171 |
| 7,847,706 B1 | 12/2010 | Ross et al. ................... 340/12.52 |
| 8,140,667 B2 * | 3/2012 | Keyghobad et al. .......... 709/224 |
| 2001/0005368 A1 | 6/2001 | Rune ............................ 370/390 |
| 2001/0038342 A1 | 11/2001 | Foote ....................... 340/870.02 |
| 2001/0046879 A1 | 11/2001 | Schramm et al. ............. 455/525 |
| 2002/0012358 A1 | 1/2002 | Sato .............................. 370/466 |
| 2002/0013679 A1 | 1/2002 | Petite ............................ 702/188 |
| 2002/0031101 A1 | 3/2002 | Petite et al. ................... 370/310 |
| 2002/0066095 A1 | 5/2002 | Yu ................................. 717/173 |
| 2002/0110118 A1 | 8/2002 | Foley ............................ 370/352 |
| 2002/0120569 A1 | 8/2002 | Day ................................ 705/40 |
| 2002/0174354 A1 | 11/2002 | Bel et al. ....................... 713/193 |
| 2002/0186619 A1 | 12/2002 | Reeves et al. ................... 368/47 |
| 2003/0001640 A1 | 1/2003 | Lao et al. ...................... 327/165 |
| 2003/0001754 A1 | 1/2003 | Johnson et al. .......... 340/870.02 |
| 2003/0033394 A1 | 2/2003 | Stine ............................. 709/222 |
| 2003/0037268 A1 | 2/2003 | Kistler .......................... 713/310 |
| 2003/0050737 A1 | 3/2003 | Osann .......................... 700/276 |
| 2003/0112822 A1 | 6/2003 | Hong et al. ................... 370/469 |
| 2003/0117966 A1 | 6/2003 | Chen ............................. 370/255 |
| 2003/0122686 A1 | 7/2003 | Ehrke et al. .............. 340/870.02 |
| 2003/0123481 A1 | 7/2003 | Neale et al. ................... 370/466 |
| 2003/0156715 A1 | 8/2003 | Reeds, III et al. .............. 380/37 |
| 2003/0163224 A1 * | 8/2003 | Klaar et al. ................... 700/286 |
| 2003/0229900 A1 | 12/2003 | Reisman ......................... 725/87 |

| Publication No. | Date | Inventor | Class |
|---|---|---|---|
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/172 |
| 2004/0034773 A1 | 2/2004 | Balabine et al. | 713/168 |
| 2004/0056775 A1 | 3/2004 | Crookham et al. | 340/825 |
| 2004/0066310 A1 | 4/2004 | Ehrke et al. | 340/870.02 |
| 2004/0077341 A1 | 4/2004 | Chandranmenon et al. | 455/418 |
| 2004/0082203 A1 | 4/2004 | Logvinov et al. | 439/10 |
| 2004/0100953 A1 | 5/2004 | Chen et al. | 370/389 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0210544 A1 | 10/2004 | Shuey et al. | 705/412 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0201397 A1 | 9/2005 | Petite | 370/401 |
| 2005/0243867 A1 | 11/2005 | Petite | 370/474 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/338 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer, III et al. | 370/337 |
| 2006/0111111 A1 | 5/2006 | Ovadia | 455/439 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/295 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217283 A1 | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0060147 A1 | 3/2007 | Shin et al. | 455/445 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0103324 A1 | 5/2007 | Kosuge et al. | 340/618 |
| 2007/0109121 A1 | 5/2007 | Cohen | 340/539.26 |
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/412 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0310311 A1 | 12/2008 | Flammer et al. | 370/238 |
| 2008/0310377 A1 | 12/2008 | Flammer et al. | 370/338 |
| 2008/0317047 A1 | 12/2008 | Zeng et al. | 370/401 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |

| | | | | |
|---|---|---|---|---|
| 2009/0034432 | A1 | 2/2009 | Bonta et al. | 370/255 |
| 2009/0043911 | A1 | 2/2009 | Flammer et al. | 709/238 |
| 2009/0046732 | A1 | 2/2009 | Pratt, Jr. et al. | 370/406 |
| 2009/0055032 | A1 | 2/2009 | Rodgers | 700/295 |
| 2009/0068947 | A1 | 3/2009 | Petite | 455/462 |
| 2009/0077405 | A1 | 3/2009 | Johansen | 713/323 |
| 2009/0079584 | A1 | 3/2009 | Grady et al. | 340/870.02 |
| 2009/0082888 | A1 | 3/2009 | Johansen | 700/94 |
| 2009/0096605 | A1 | 4/2009 | Petite et al. | 340/539.22 |
| 2009/0102737 | A1 | 4/2009 | Birnbaum et al. | 343/828 |
| 2009/0115626 | A1 | 5/2009 | Vaswani et al. | 340/870.02 |
| 2009/0134969 | A1 | 5/2009 | Veillette | 340/3.1 |
| 2009/0135716 | A1 | 5/2009 | Veillette | 370/221 |
| 2009/0135843 | A1 | 5/2009 | Veillette | 370/406 |
| 2009/0161594 | A1 | 6/2009 | Zhu et al. | 370/312 |
| 2009/0167547 | A1 | 7/2009 | Gilbert | 340/662 |
| 2009/0168846 | A1 | 7/2009 | Filippo, III et al. | 375/133 |
| 2009/0175238 | A1 | 7/2009 | Jetcheva et al. | 370/329 |
| 2009/0179771 | A1 | 7/2009 | Seal et al. | 340/870.04 |
| 2009/0235246 | A1 | 9/2009 | Seal et al. | 717/173 |
| 2009/0243840 | A1 | 10/2009 | Petite et al. | 340/539.1 |
| 2009/0245270 | A1 | 10/2009 | van Greunen et al. | 370/410 |
| 2009/0262642 | A1 | 10/2009 | van Greunen et al. | 370/216 |
| 2009/0267792 | A1 | 10/2009 | Crichlow | 340/870.02 |
| 2009/0285124 | A1 | 11/2009 | Aguirre et al. | 370/255 |
| 2009/0303972 | A1 | 12/2009 | Flammer, III et al. | 370/338 |
| 2009/0315699 | A1 | 12/2009 | Satish et al. | 340/533 |
| 2009/0319672 | A1 | 12/2009 | Reisman | 709/227 |
| 2009/0320073 | A1 | 12/2009 | Reisman | 725/51 |
| 2010/0037069 | A1 | 2/2010 | Deierling et al. | 713/193 |
| 2010/0037293 | A1 | 2/2010 | St. Johns et al. | 726/2 |
| 2010/0040042 | A1 | 2/2010 | van Greunen et al. | 370/350 |
| 2010/0060259 | A1 | 3/2010 | Vaswani et al. | 324/86 |
| 2010/0061350 | A1 | 3/2010 | Flammer, III | 370/338 |
| 2010/0073193 | A1 | 3/2010 | Flammer, III | 340/870.11 |
| 2010/0074176 | A1 | 3/2010 | Flammer, III et al. | 370/328 |
| 2010/0074304 | A1 | 3/2010 | Flammer, III | 375/134 |
| 2011/0176433 | A1* | 7/2011 | Monogioudis | 370/252 |

FOREIGN PATENT DOCUMENTS

| | | |
|---|---|---|
| EP | 0 663 746 B1 | 1/2003 |
| EP | 0 812 502 B1 | 8/2004 |
| EP | 0 740 873 B1 | 12/2005 |
| JP | 10-070774 | 3/1998 |
| JP | 10-135965 | 5/1998 |
| WO | WO 95/12942 | 5/1995 |
| WO | WO 96/10307 | 4/1996 |
| WO | WO 96/10307 A1 | 4/1996 |
| WO | WO 00/54237 | 9/2000 |
| WO | WO 01/26334 A2 | 4/2001 |
| WO | WO 01/55865 A1 | 8/2001 |
| WO | WO 03/015452 | 2/2003 |
| WO | WO 2005/091303 | 9/2005 |
| WO | WO 2006/059195 | 6/2006 |
| WO | WO 2007/015822 | 8/2007 |
| WO | WO 2007/132473 | 11/2007 |
| WO | WO 2008/027457 | 3/2008 |
| WO | WO 2008/033287 A2 | 3/2008 |
| WO | Wo 2008/033514 A2 | 3/2008 |
| WO | WO 2008/038072 | 4/2008 |
| WO | WO 2008/092268 A1 | 8/2008 |
| WO | WO 2009/067251 | 5/2009 |

OTHER PUBLICATIONS

Trilliant Networks, "The Trilliant Ami Solution," RFP SCP-07003, 50 pp., Mar. 22, 2007.
"ZigBee Smart Energy Profile Specification," ZigBee Profile 0x0109, Revision 14, Document 075356r14, 202 pp., May 29, 2008.
Hubaux, J. P., et al. "Towards Mobile Ad-Hoc WANs: Terminodes," 2000 IEEE, Wireless Communications and Networking Conference, WCNC, vol. 3, pp. 1052-1059, 2000.
Miklos, G., et al., "Performance Aspects of Bluetooth Scatternet Formation," First Annual Workshop on Mobile and Ad Hoc Networking and Computing, MobiHOC 2000, pp. 147-148, 2000.
Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," Tencon, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101 &CompanyId=3.
Utility Intelligence, "Exclusive Distributors of Dynamic Virtual Metering" [online], Copyright 2004-2005 [retrieved on May 12, 2005], Retrieved from the Internet: http://empoweringgutilities.com/hardware.html, 29 pp.
"AMRON Meter Management System" [online], [retrieved on May 12, 2005], 41 pp., Retrieved from the Internet: http://www.amronm5.com/products/.
Reexamination U.S. Appl. No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.
Katz, Randy H. and Brewer, Eric A., "The Case for Wireless Overlay Networks," *Electrical Engineering and Computer Science Department, University of California*, Berkeley, 12 pp., 1996.
Johnson, David B., "Routing in Ad Hoc Networks of Mobile Hosts," *IEEE*, pp. 158-163, 1995.
Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987).

Nachum Shacham & Janet D. Tornow, Future Directions in Packet Radio Technology, Proc. Of the IEEE Infocom 1985 at 93 (Mar. 1985). 17 pp.

John Jubin & Janet D. Tornow, The DARPA Packet Radio Network Protocols, Proc. of the IEEE, vol. 75, No. 1 at 21 (Jan. 87).

John Jubin, Current Packet Radio Network Protocols, Proc. of the IEEE Infocom1985 at 86 (Mar. 1985), 9 pp.

David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), 18 pp.

David B. Johnson, Mobile Host Internetworking Using IP Loose Source Routing, Carnegie Mellon University CMU-CS-93-128, DARPA Order No. 7330 (Feb. 1993), 18 pp.

Daniel M. Frank, Transmission of IP Datagrams Over NET/ROM Networks, Proc. of the ARRL 7th Computer Networking Conference 1988 at 65 (Oct. 1988), 6 pp.

Robert E. Kahn, et al., Advances in Packet Radio Technology, Proc. of the IEEE, vol. 66, No. 11, pp. 1468-1496 (Nov. 1978).

Clifford A. Lynch & Edwin B. Brownrigg, Packet Radio Networks, Bergamon Press, 259-74 (1987).

Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), 11 pp.

William MacGregor, Jil Westcott, & Michael Beeler, Multiple Control Stations in Packet Radio Networks, 1982 IEEE Military Communications Conference, vol. 3 at 10.3-1 (Oct. 1982), 6 pp.

Nachum Shacham & Jil Westcott, Future Directions in Packet Radio Architectures and Protocols, Proc. of the IEEE, vol. 75, No. 1 at 83 (Jan. 1987), 17 pp.

David B. Johnson and David A. Maltz, Protocols for Adaptive Wireless and Mobile Networking, IEEE Personal Communications, Feb. 1996, p. 34-42.

Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.

David A. Beyer, Accomplishments of the DARPA SURAN Program, IEEE MILCOM 1990, p. 39.6.1-8.

William S. Hortos, Application of Neural Networks to the Dynamic Spatial Distribution of Nodes within an Urban Wireless Network, SPIE, vol. 2492, p. 58-70, 1995.

Nachum Shacham and Richard G. Ogier, Network Control and Data Transport for C3I Applications, IEEE 1987, p. 30.5.1-6.

John E. Rustad, Reidar Skaug, and Andreas Aasen, New Radio Networks for Tactical Communication, IEEE Jornal on Selected Areas in Communications, vol. 8, No. 5, p. 713-727, Jun. 1990.

Barry M. Leiner, Donald L. Nielson, and Fouad A. Tobagi, Issues in Packet Radio Network Design, Proceedings of the IEEE, vol. 75, No. 1, p. 6-20, Jan. 1987.

Janet Tornow, Functional Summary of the DARPA SURAP1 Network, DARPA, Sep. 1986, 17 pp.

John F. Shoch and Lawrence Stewart, Interconnecting Local Networks via the Packet Radio Network, Sixth Data Communications Symposium, Nov. 1979, pp. 153-158.

J.R. Cleveland, Performance and Design Considerations for Mobile Mesh Networks, IEEE MILCOM 96, vol. 1, p. 245-249.

Cmdr. R. E. Bruninga, USN, A Worldwide Packet Radio Network, Signal, vol. 42, No. 10, p. 221-230, Jun. 1988.

Nachum Shacham and Janet Tornow, Packet Radio Networking, Telecommunications, vol. 20, No. 9, p. 42-48, 64, 82, Sep. 1986.

Spencer T. Carlisle, Edison's NetComm Project, IEEE 1989, Paper No. 89CH2709-4-B5, p. B5-1-B5-4.

Brian H. Davies and T.R. Davies, The Application of Packet Switching Techniques to Combat Net Radio, Proceedings of the IEEE, vol. 75, No. 1, p. 43-55, Jan. 1987.

Fouad A. Tobagi, Richard Binder, and Barry Leiner, Packet Radio and Satellite Networks, IEEE Communications Magazine, vol. 22, No. 11, p. 24-40, Nov. 1984.

M. Scott Corson, Joseph Macker, and Stephen G. Batsell, Architectural Considerations for Mobile Mesh Networking, IEEE MILCOM 96, vol. 1, p. 225-229.

K.Y. Eng, et. al., Bahama: A Broadband Ad-Hoc Wireless ATM Local-Area Network, 1995 IEEE International Conference on Communications, vol. 2, p. 1216-1223, Jun. 18-22, 1995.

J. Jonquin Garcia-Luna-Aceves, A Fail-Safe Routing Algorithm for Multihop Packet-Radio Networks, IEEE INFOCOM '86, p. 434-43, Apr. 8-10, 1986.

Johanes P. Tamtomo, A Prototype of TCP/IP-Based Internet-PRNET for Land Information Networks and Services, Department of Surveying Engineering, University of New Brunswick, Jan. 25, 1993, 118 pp.

A. Alwan, et al., Adaptive Mobile Multimedia Networks, IEEE Personal Communications, p. 34-51, Apr. 1996.

Michael Ball, et al., *Reliability of Packet Switching Broadcast Radio Networks*, IEEE Transactions on Circuits and Systems, vol. Cas-23, No. 12, p. 806-813 ,Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts*, Proceedings of the $16^{th}$ ICDCS, p. 319-326, 1996.

Daniel Cohen, Jonathan B. Postel, and Raphael Rom, *IP Addressing and Routing in a Local Wireless Network*, IEEE Infocom 1992, p. 5A.3.1-7.

Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.

Jonathan J. Hahn and David M. Stolle, *Packet Radio Network Routing Algorithms: A Survey*, IEEE Communications Magazine, vol. 22, No. 11, p. 41-7, Nov. 1984.

David a. Hall, *Tactical Internet System Architecture for the Task Force XXI*, IEEE 1996, p. 219-230.

Robert Hinden and Alan Sheltzer, *The DARPA Internet Gateway*, DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.

David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.

David B. Johnson, *Route Optimization in Mobile IP*, Nov. 28, 1994, http://www.monarch.cs.rice.edu/internet-drafts-ietf-mobileip-optim-00.txt (last visited Sep. 26, 2009), 32 pp.

Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Charles E. Perkins and Pravin Bhagwat, *A Mobile Networking System Based on Internet Protocol*, IEEE Personal Communications, First Quarter 1994, IEEE 1994, p. 32-41.

Richard Schulman, Richard Snyder, and Larry J. Williams, *SINCGARS Internet Controller-Heart of the Digitized Battlefield*, Proceedings of the 1996 Tactical Communications Conference, Apr. 30-May 2, 1996, Fort Wayne, Indiana, p. 417-421.

Nachum Shacham and Earl J. Craighill, *Dynamic Routing for Real-Time Data Transport in Packet Radio Networks*, Proceedings of INFOCOM 1982, IEEE 1982, p. 152-158.

R. Lee Hamilton, Jr. and Hsien-Chuen Yu, *Optimal Routing in Multihop Packet Radio Networks*, IEEE 1990, p. 389-396.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/89, p. 367-382.

D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-207.

Jens Zander and Robert Forchheimer, *The SOFTNET Project: A Retrospect*, IEEE Eurocon, Jun. 13-17, 1988, p. 343-345.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-213.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-486.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-218.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009, 7 pp.

International Search Report and Written Opinion for Application No. PCT/US08/13018, dated Jan. 30, 2009, 9 pp.

International Search Report and Written Opinion for Application No. PCT/US08/13020, dated Jan. 9, 2009, 8 pp.

International Search Report and Written Opinion for Application No. PCT/US08/13028, dated Jan. 15, 2009, 9 pp.

International Search Report and Written Opinion for Application No. PCT/US08/13021, dated Jan. 15, 2009, 11 pp.

International Search Report and Written Opinion for Application No. PCT/US08/13016, dated Jan. 9, 2009, 7 pp.

Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).

Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).

Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, CH, No. 1, Jul. 7, 2007 (XP015050851) (ISSN: 000-0004).

Perkins, C. E., et al., "Ad Hoc On-Demand Distance Vector (AODV) Routing," Network Working Group Internet Draft, XX, Nov. 9, 2001 (XP002950167).

Postel, J., "RFC 793 Transmission Control Protocol," Sep. 1981 [retrieved on Jan. 1, 2007], Retrieved From the Internet: http://www.ietf.org/rfc/rfc0793.txt.

Supplementary European Search Report for Application No. EP 08 85 1927, dated Dec. 22, 2010, 10 pp.

Younis, M., et al., "Energy-Aware Routing in Cluster-Based Sensor Networks," Modeling, Analysis and Simulation of Computer and Telecommunications Systems, 10th IEEE Proceedings on Mascots, Oct. 11-16, 2002, Piscataway, NJ (XP010624424) (ISNB: 978-0-7695-1840-4).

Supplementary European Search Report for Application No. EP 08 85 3052, dated Mar. 18, 2011, 10 pp.

Supplementary European Search Report for Application No. EP 08 85 1560, dated Mar. 24, 2011, 9 pp.

Supplementary European Search Report for Application No. EP 08 85 2992, dated Mar. 23, 2011, 6 pp.

International Search Report and Written Opinion for Application No. PCT/US08/13024, dated Jan. 13, 2009, 9 pp.

International Search Report and Written Opinion for Application No. PCT/US08/13022, dated Jan. 27, 2009, 10 pp.

International Search Report and Written Opinion for Application No. PCT/US08/13030, dated Jan. 9, 2009, 7 pp.

International Search Report and Written Opinion for Application No. PCT/US08/12161, dated Mar. 2, 2009, 13 pp.

International Search Report and Written Opinion for Application No. PCT/US08/13017, dated Mar. 18, 2009, 11 pp.

International Search Report and Written Opinion for Application No. PCT/US08/13026, dated Feb. 24, 2009, 9 pp.

International Search Report and Written Opinion for Application No. PCT/US08/13029, dated Feb. 2, 2009, 8 pp.

International Search Report and Written Opinion for Application No. PCT/US08/13032, dated May 12, 2009, 14 pp.

International Search Report and Written Opinion for Application No. PCT/US09/05008, dated Oct. 22, 2009, 8 pp.

Leis, John, "TCP/IP Protocol Family," pp. 1 and 42-43, Apr. 3, 2006.

Supplementary European Search Report for Application No. EP 08 85 1869, dated Dec. 30, 2010, 7 pp.

International Search Report and Written Opinion for Application No. PCT/US10/26956, date May 19, 2010, 2 pp.

Supplementary European Search Report for Application No. EP 08 85 1132, dated Dec. 16, 2010, 9 pp.

\* cited by examiner

DIFFERENTIAL

PROCESS, DEVICE AND SYSTEM FOR MAPPING TRANSFORMERS TO METERS AND LOCATING NON-TECHNICAL LINE LOSSES

CROSS-REFERENCE TO RELATED APPLICATIONS

This application claims priority to co-pending U.S. Provisional Application No. 61/159,202 filed Mar. 11, 2009 entitled "PROCESS FOR MAPPING TRANSFORMERS TO METERS AND LOCATING NON-TECHNICAL LINE LOSSES", which is incorporated herein by this reference.

This application hereby references and incorporates by reference in its entirety U.S. patent application Ser. No. 12/275,242 entitled "COLLECTOR DEVICE AND SYSTEM UTILIZING STANDARDIZED UTILITY METERING PROTOCOL".

FIELD OF THE INVENTION

The present invention relates to utility usage node-to-utility distribution node mapping, and in particular to processes, devices and systems for mapping usage data from a plurality of utility usage nodes, such as electricity usage meters, to at least one utility distribution node, such as a transformer.

BACKGROUND OF THE INVENTION

Utility companies typically keep records of the electrical connections between individual service delivery points (for example, sockets and electricity meters at homes) and pole- or pad-mounted transformers used to reduce or "transform" the high voltage from the utility down to the 120/240 volt residential service. These records are often inaccurate, sometimes inaccurate more than 50% of the time. In addition, in some cases utility commodities, e.g., electricity, are consumed by non-metered loads, referred to as "non-technical line loss;" often the result of theft.

In addition to theft, such inaccuracies in mapping can result from incorrect wiring in response to an outage and even incorrect wiring or reporting of such wiring at initial installation. For numerous reasons, it is important and would be useful for utility companies to have more accurate mappings. Obviously, theft prevention is critical to customers and the utility companies. Further, in the event of a power outage, knowing exactly which transformer(s) to attend to in order to restore power would greatly reduce down time, as well as utility company employee work time, etc.

Utilities have traditionally performed the transformer-to-meter mapping with field surveys, which are expensive, time consuming, and are generally infrequent so they do not provide continuous data. Such field surveys can actually be conducted by physically following wires from houses to the transformer drums, but the limitations to this method of mapping are fairly obvious. Specifically, the issue is how to determine which house is connected to which transformer and to which phase on the particular transformer.

Such mapping can be attempted with power line carrier meters (i.e., a communications technology that runs over the power line itself) and transformer monitoring. For example, the possibility has been considered of locating a power line carrier communications device at each transformer for the different phases that is connected to meters at various houses. Determining with which meters the communications device can communicate should also indicate to which meters the different phases are connected. However, this solution is generally not economical as it requires the installation of individual monitors at the transformers and meters.

Accordingly, there is a need in the art for a process that allows for accurate and efficient mapping of meters to pole or pad transformers.

SUMMARY OF THE INVENTION

Embodiments of the present invention uses software analytics along with wired or wireless interval metering, without requiring a hard wire connection, in order to more accurately perform transformer-to-meter mapping. For example, using software analytics, the usage can be monitored at each house, and the load can also be monitored on each phase at the transformer. Then, using geographical data, such as the location of houses within a certain distance (e.g., one-half mile) from that transformer, and using a succession of combinations of load profiles from a variety of those houses, the combination of houses that best fits the load profile at the particular transformer can be determined. Further, the present invention facilitates quasi-real-time determination and localization of non-technical line losses.

More particularly, the application of embodiments of the present invention with assumptions and inputs from a multitude of devices on the utility distribution network will provide the utility provider with guidance to make more informed decisions for the use of assets and personnel. For example, there are other kinds of devices that utilities can deploy on the distribution lines in addition to transformer power monitors, such as line current monitors. Additionally, voltage information can be obtained using voltage monitors on the lines or on transformers and at houses, and voltage information can be used to determine which house is connected to which phase on which transformer. Embodiments of the present invention can be used for determining distribution phase load allocation and switched circuit status. Embodiments of the invention will provide utilities with better knowledge of the assets within a geographic region between the substation to the meters and better location for where resources need to be dispatched for work.

Embodiments of the present invention contemplate the use of interval data obtained through economical wireless solutions allowing frequent, reliable correlation and mapping between meters and transformers. It also allows quick and accurate determination of non-technical line losses associated with specific transformers by identifying unallocated consumption. This application of data can then further enhance the analysis for other utility distribution system equipment and configuration status.

Embodiments of the invention utilize, for example, computer hardware, operating systems, programming languages, software applications, and other technology to provide processes, devices and systems for mapping usage data from a plurality of utility usage nodes to at least one utility distribution node that involves, for example, collecting, at a collection device, utility usage data from the plurality of utility usage nodes at predetermined intervals, collecting, at the collection device, utility distribution data from the at least one utility distribution node at the predetermined intervals, and determining, using a computer, which of the plurality of utility usage nodes is connected to the at least one utility distribution node by comparing aggregate usage data from one or more of the plurality of utility usage nodes to distribution data from the at least one utility distribution node during at least one same predetermined interval.

In one aspect, the plurality of utility usage nodes for embodiments of the invention comprises, for example, a plurality of electricity usage nodes, a plurality of water usage nodes, or a plurality of gas usage nodes. In another aspect, the predetermined intervals for embodiments of the invention comprise predetermined intervals of at least one minute, predetermined intervals of up to one hour, or predetermined intervals of between at least one minute and up to one hour. In a further aspect, the plurality of utility usage nodes for embodiments of the invention comprises a plurality of electricity usage meters.

In an additional aspect of embodiments of the invention, collecting, at the collection device, the utility usage data from the plurality of utility usage nodes further comprises collecting, at the collection device, the utility usage data from the plurality of utility usage meters over a wireless network. In a still further aspect, collecting, at the collection device, the utility usage data from the plurality of utility usage nodes further comprises collecting, at the collection device, the utility usage data from the plurality of utility usage meters over a wired network. In still another aspect, the plurality of utility usage meters are time synchronized with one another.

In another aspect, the at least one utility distribution node for embodiments of the invention comprises at least one electricity distribution node, at least one water distribution node, or at least one gas distribution node. In still another aspect, the at least one utility distribution node for embodiments of the invention comprises at least one transformer, and the at least one transformer can further comprise at least one transformer load meter. In an additional aspect for embodiments of the invention, collecting, at the collection device, utility distribution data from the at least one utility distribution node further comprises collecting, at the collection device, load meter data from the at least one transformer load meter over a wireless network.

In a further aspect for embodiments of the invention, collecting, at the collection device, utility distribution data from the at least one utility distribution node further comprises collecting, at the collection device, load meter data from the at least one transformer load meter over a wired network. In a still further aspect, the plurality of utility usage nodes for embodiments of the invention further comprise a plurality of electricity usage meters that are time synchronized with one another and also synchronized with the at least one transformer load meter. In another aspect, the at least one utility distribution node for embodiments of the invention further comprises at least one of a substation bank, a circuit breaker, a line capacitor, a circuit recloser, or a circuit switch.

According to an aspect for embodiments of the invention, determining which of the plurality of utility usage nodes is connected to the at least one utility distribution node further comprises determining that all of the plurality of utility usage nodes are connected to the at least one utility distribution node when utility usage according to the aggregate usage data from all of the plurality of utility usage nodes is substantially equal to utility distribution according to the distribution data from the at least one utility distribution node during the at least one same predetermined interval.

According to another aspect for embodiments of the invention, determining which of the plurality of utility usage nodes is connected to the at least one utility distribution node further comprises determining that a condition of unallocated consumption exists for the at least one utility distribution node when utility usage according to the aggregate usage data from all of the plurality of utility usage nodes is less than the utility distribution according to the distribution data from the at least one utility distribution node during the at least one same predetermined interval.

In a further aspect for embodiments of the invention, determining that a condition of unallocated consumption exists further comprises determining that a non-technical line loss exists for the at least one utility distribution node when utility usage according to the aggregate usage data from all of the plurality of utility usage nodes is less than the utility distribution according to the distribution data from the at least one utility distribution node during the at least one same predetermined interval.

In an additional aspect for embodiments of the invention, determining that a condition of unallocated consumption exists further comprises determining that at least one additional utility usage node is connected to the at least one utility distribution node when the utility usage according to the aggregate usage data from all of the plurality of utility usage nodes is less than the utility distribution according to the distribution data from the at least one utility distribution node during the at least one same predetermined interval.

In another aspect for embodiments of the invention, determining that at least one additional utility usage node is connected to the at least one utility distribution node further comprises identifying the at least one additional node by comparing utility usage according to usage data from said at least one additional utility usage node to an amount by which the utility usage according to the aggregate usage data from the plurality of utility usage nodes is less than the utility distribution according to the distribution data from the at least one utility distribution node during the at least one same predetermined interval.

In still another aspect for embodiments of the invention, determining which of the plurality of utility usage nodes is connected to the at least one utility distribution node further comprises determining that less than all of the plurality of utility usage nodes are connected to the at least one utility distribution node when utility usage according to the aggregate usage data from all of the plurality of utility usage nodes exceeds the utility distribution according to the distribution data from the at least one utility distribution node during the at least one same predetermined interval.

In a still further aspect for embodiments of the invention, determining that less than all of the plurality of utility usage nodes are connected to the at least one utility distribution node further comprises identifying at least one of the plurality of utility usage nodes that is not connected to the at least one utility distribution node by comparing utility usage according to usage data from said at least one of the plurality of utility usage nodes to an amount by which utility according to the aggregate usage data from all of the plurality of utility usage nodes exceeds utility distribution according to the distribution data from the at least one utility distribution node during the at least one same predetermined interval.

Other aspects for embodiments of the invention provide, for example, a machine for mapping usage data from a plurality of utility usage nodes to at least one utility distribution node comprising a microprocessor coupled to a memory, wherein the microprocessor is programmed to receive utility usage data collected, at a collection device, from the plurality of utility usage nodes at predetermined intervals, to receive utility distribution data collected, at the collection device, from the at least one utility distribution node at the predetermined intervals, and to determine which of the plurality of utility usage nodes is connected to the at least one utility distribution node by comparing aggregate usage data from one or more of the plurality of utility usage nodes to distribution data from the at least one utility distribution node during at least one same predetermined interval.

Still other aspects for embodiments of the invention provide, for example, a non-transitory computer-readable storage medium with an executable program stored therein, wherein the program instructs a microprocessor to perform the steps of receiving utility usage data collected, at a collection device, from the plurality of utility usage nodes at predetermined intervals, receiving utility distribution data collected, at the collection device, from the at least one utility distribution node at the predetermined intervals, and determining which of the plurality of utility usage nodes is connected to the at least one utility distribution node by comparing aggregate usage data from one or more of the plurality of utility usage nodes to distribution data from the at least one utility distribution node during at least one same predetermined interval.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION OF INVENTION

Various aspects of the embodiments will now be described. The following description provides specific details for a thorough understanding and enabling description of these examples. Many of these specific details are optional. One skilled in the art will understand, however, that the invention and its various embodiments may be practiced without many of these specific details and options. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples. Certain terms may even be emphasized below; however, any terminology intended to be interpreted in any restricted manner will be overtly and specifically defined as such in this detailed description section. Aspects, features, and elements of the invention and of embodiments of the invention are described throughout the written description and the drawings and claims.

Figure 1:
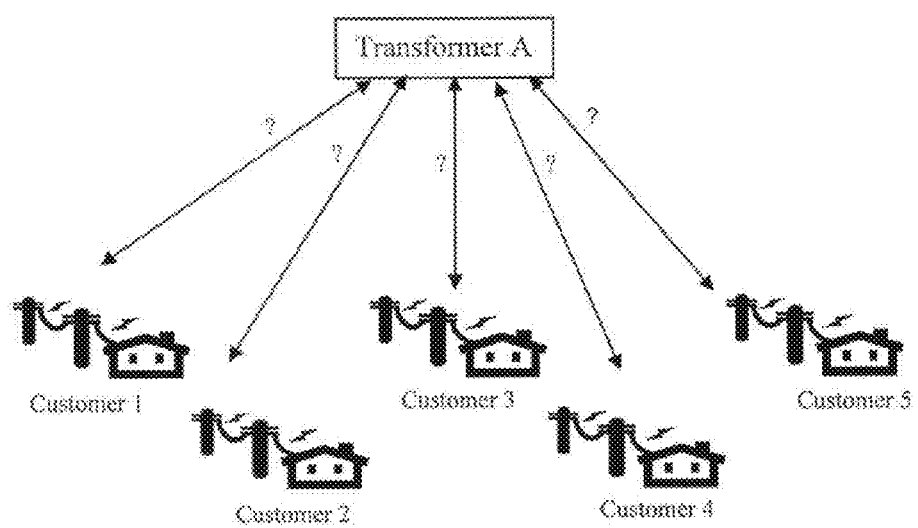
FIG. 1 is a schematic diagram that illustrates an example of a plurality of customer electricity usage meters connected to a transformer.
Figure 2:
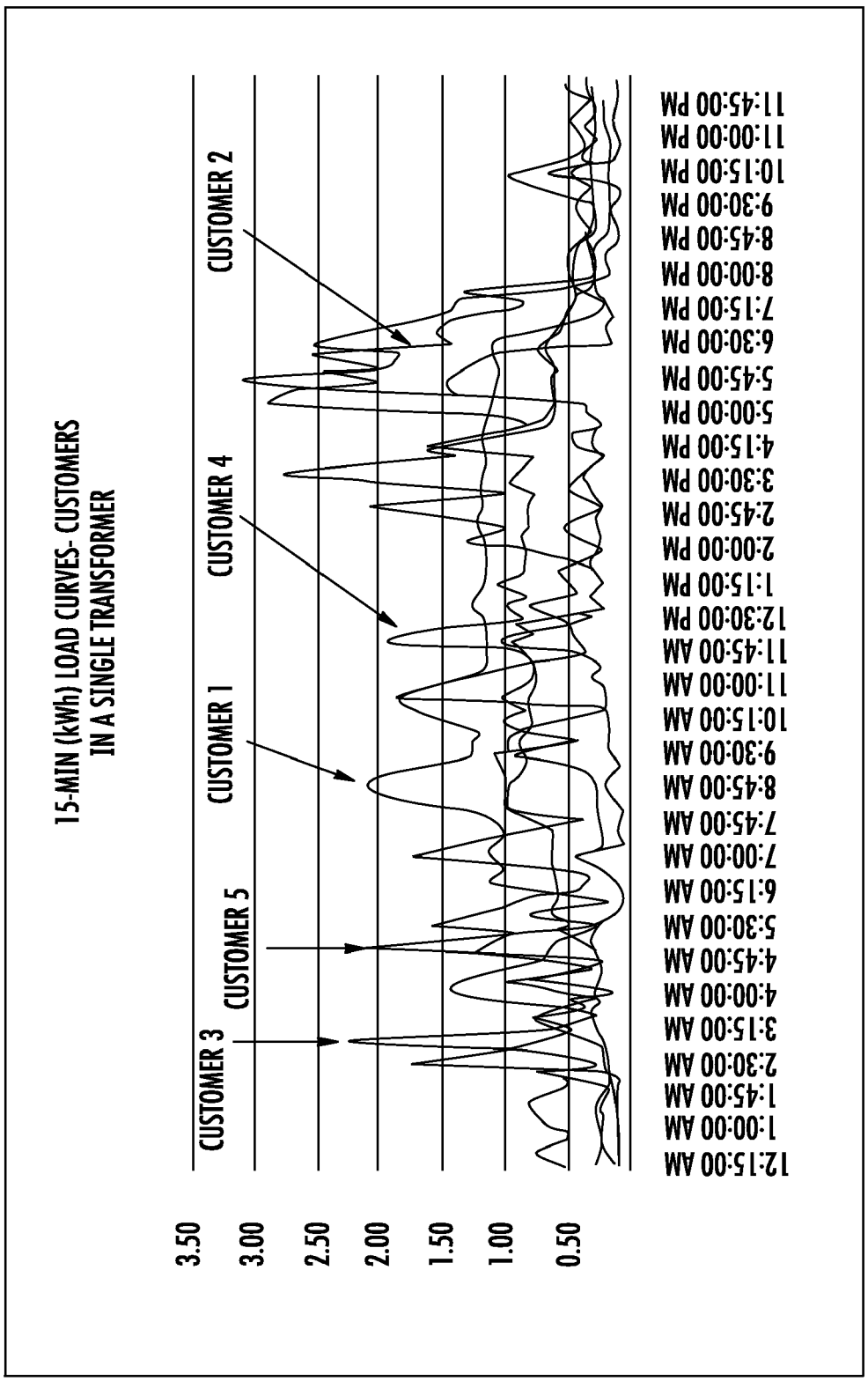
FIG. 2 shows exemplary interval meter data for embodiments of the invention from five residential electricity customers.

Embodiments of the invention provide a process, device and system of analyzing interval energy consumption data from electricity meters and transformer meters to determine the meter-to-transformer mapping. For example, referring to FIG. 1, the present invention facilitates determining if all or some combination of the Customer meters 1 through 5 are connected to Transformer A. Using load meter data from Transformer A collected over a predetermined period of time, this load information is compared to various combinations of load meter totals over the same period of time for Customers 1 through 5. When there is a match, it is known which Customers 1 through 5 are connected to Transformer A. In other words, for any given time interval, if the cumulative power consumption measured at all five house meters equals the load measured at the transformer, then it can be concluded that only those five house meters are connected to the transformer FIG. 2 shows exemplary interval meter data from five residential electricity customers. As shown, the consumption interval data from the five homes varies greatly depending on which homes are attached to the transformer. Given the significant variance over smaller intervals, such consumption data makes it possible to map individual meters to transformers on a quasi-real time basis. Such mapping would not be possible using the standard monthly data because the time variation is not such that meter inaccuracy could be eliminated as a source of uncertainty. Put another way, it is entirely possible that the total monthly usage measured at any two or more house meters might coincidentally be the same or nearly the same, but that is not likely over smaller intervals of time. For example, even using an interval such as hourly usage yields 24 data sets to compare for each day and thousands of data sets to compare over an entire month. Such a large data set enables accurate mapping of transformers to meters even though there may be minor measurement inaccuracies in the house meters or on the transformer.

The mapping for embodiments of the invention is possible not only at the single phase level, but down to three phases as well. For example, assume there are three phases on the transformer and power consumption on each of the three phases on the transformer. Instead of five house meters per transformer as in the foregoing example, there are five house meters per phase on the transformer. Thus, the process of mapping the transformer to the meters involves matching three groups of five house meters to corresponding ones of the three phases on the particular transformer.

Figure 3:
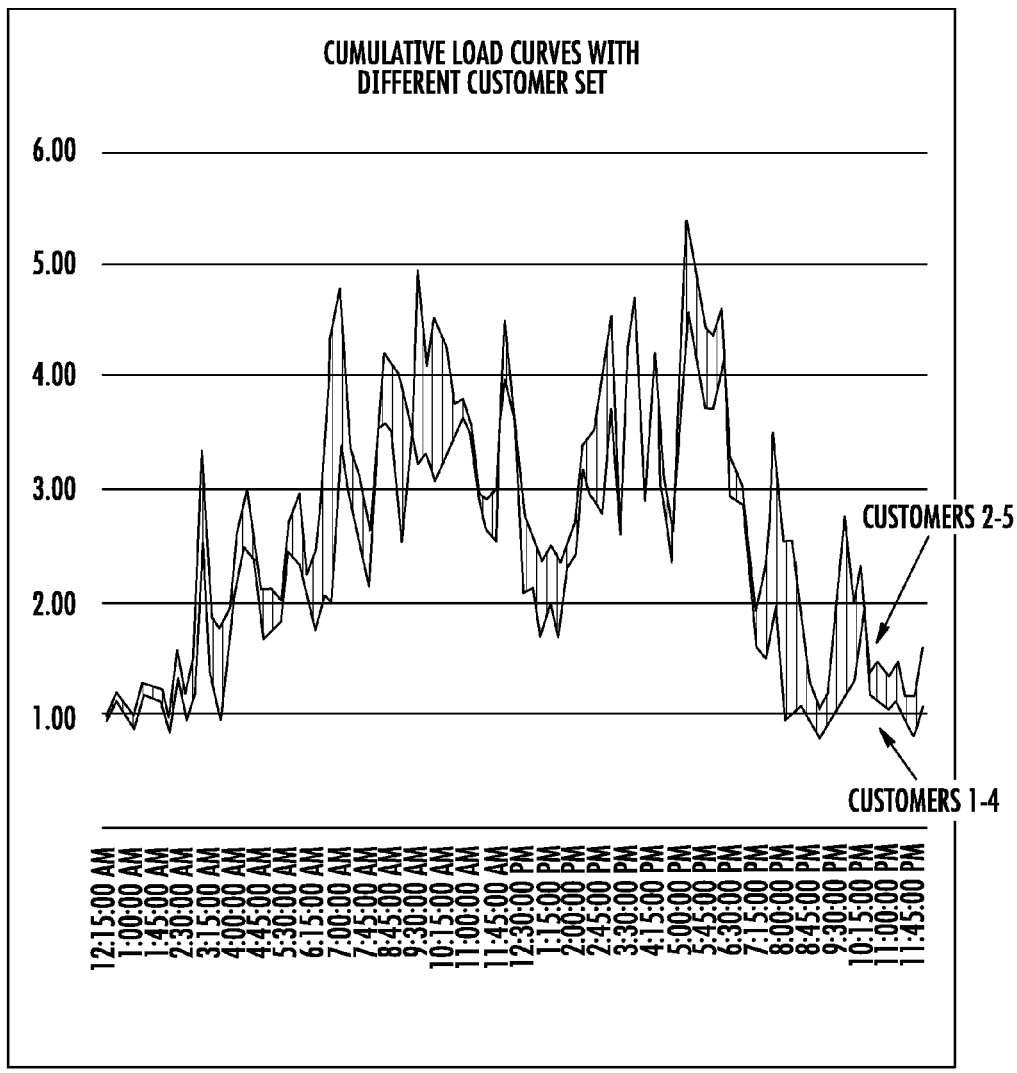
FIG. 3 shows exemplary expected interval data for embodiments of the invention at the transformer assuming customers 1-4 are connected to the transformer or assuming customers 2-5 are connected to the transformer.
Figure 3:

FIG. 3 shows exemplary expected interval data at the transformer assuming customers 1-4 are connected to the transformer or assuming customers 2-5 are connected to the transformer. The measurable difference between the two curves is significant, showing that correlation of the transformer interval meter data with the individual meter interval data can be used to determine which meters are connected to which transformer. Simply put, FIG. 3 illustrates that if the wrong set of customers is considered, the degree of non-correlation between the transformer interval meter data and the individual meter interval data is substantial.

Once an initial map is established for embodiments of the invention, the continuous data pulls and/or pushes and comparisons will allow for quick issue spotting. For example, if it is determined that Customers 1 through 5 are indeed correctly mapped to Transformer A, and, over a fixed time period, the combined load from Customer meters 1 through 5 does not match with the Transformer A load over the same fixed time period, then the utility company will be alerted that there might be an issue. The discrepancy could result from a tree touching a wire, an improper connection to or disconnection from a meter after an outage or other maintenance. The discrepancy could be the result of theft. Regardless of the source of the discrepancy, due to the quasi real-time mapping resulting from the present invention, the utility company can be alerted to a potential issue at a remote location.

Figure 4:
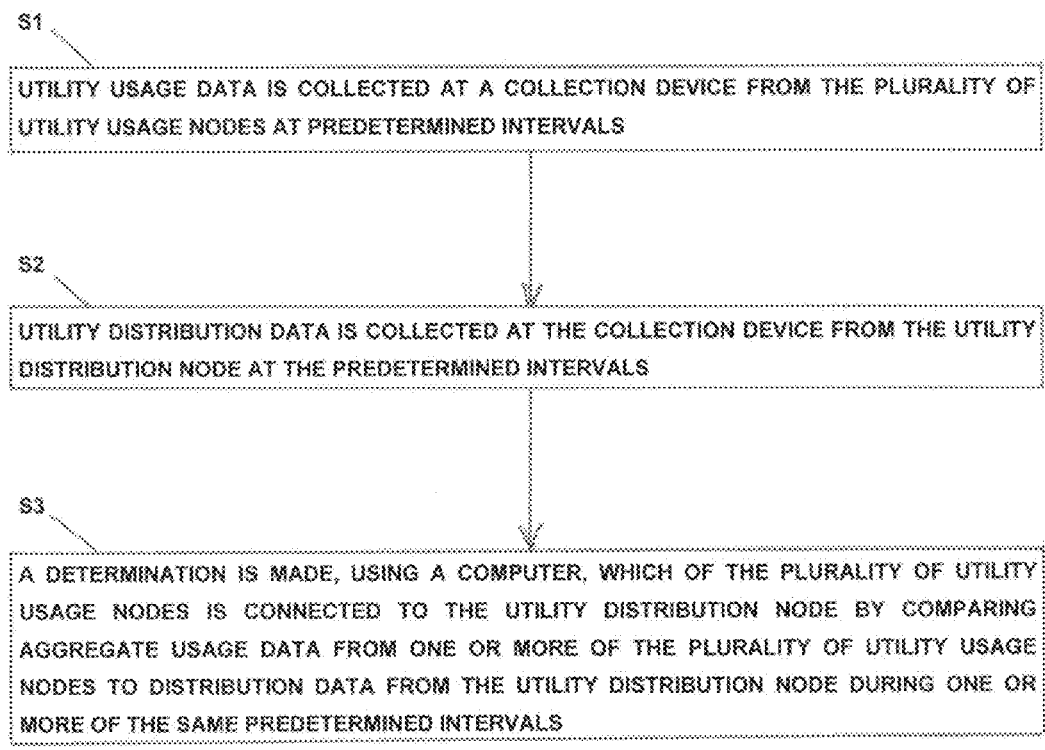
FIG. 4 is a flow diagram that illustrates an example of the process of mapping usage data from a plurality of utility usage nodes to one or more utility distribution nodes for embodiments of the invention.

FIG. 4 is a flow diagram that illustrates an example of the process of mapping usage data from a plurality of utility usage nodes to one or more utility distribution nodes for embodiments of the invention. Referring to FIG. 4, at S1, utility usage data is collected at a collection device from the plurality of utility usage nodes at predetermined intervals, and at S2, utility distribution data is collected at the collection device from the utility distribution node at the predetermined intervals. At S3, it is determined, using a computer, which of the plurality of utility usage nodes is connected to the utility distribution node by comparing aggregate usage data from one or more of the plurality of utility usage nodes to distribution data from the utility distribution node during one or more of the same predetermined intervals.

It is to be understood that although the plurality of utility usage nodes and the utility distribution node for illustrative embodiments of the invention comprise, respectively, a plurality of electricity usage nodes consisting, for example, of a plurality of electricity usage meters, and an electricity distribution node, such as a transformer with a transformer load meter, the plurality of utility usage nodes and the utility distribution node may likewise comprise any other type of utility nodes such as water usage and distribution nodes or gas usage and distribution nodes. Further, the utility usage data may be collected from the plurality of electricity usage meters and the transformer load meter over a wireless network or over a wired network. In any event, a key aspect of embodiments of the invention is that the utility usage meters are time synchronized with one another and with the transformer load meter.

It is also to be understood that while the interval shown for the interval data in FIGS. 2 and 3 is three quarters of an hour, any other suitable interval as little as a few seconds up to several hours may be utilized for embodiments of the invention. Preferably, embodiments of the invention utilize a predetermined interval of at least one minute up to one hour. It is to be further noted that while the utility distribution node for illustrative embodiments of the invention comprises a transformer, the utility distribution node may likewise comprise, for example, a substation bank, a circuit breaker, a line capacitor, a circuit recloser, or a circuit switch.

Referring further to FIG. 4, when the comparison at S3 discloses that utility usage according to the aggregate usage data from all of the plurality of utility usage nodes is substantially equal to utility distribution according to the distribution data from the utility distribution node during the one or more same predetermined intervals, it is determined that all of the plurality of utility usage nodes are connected to the utility distribution node. On the other hand, when the comparison discloses that utility usage according to the aggregate usage data from all of the plurality of utility usage nodes is less than the utility distribution according to the distribution data from the utility distribution node during the same predetermined interval or intervals, it is determined that a condition of unallocated consumption exists for the utility distribution node.

As previously, noted, the condition of unallocated consumption can be attributed to a non-technical line loss (i.e. theft) or alternatively the condition of unallocated consumption can be attributed to the existence of one or more additional utility usage nodes connected to the distribution node. An aspect of embodiments of the invention involves identifying the additional node by comparing utility usage according to usage data from the additional utility usage node to an amount by which the utility usage according to the aggregate usage data from the plurality of utility usage nodes is less than the utility distribution according to the distribution data from the utility distribution node during the same predetermined interval or intervals.

Referring again to FIG. 4, when the comparison at S3 discloses that utility usage according to the aggregate usage data from all of the plurality of utility usage according to the aggregate usage data from all of the plurality of utility usage nodes exceeds the utility distribution according to the distribution data from the utility distribution node during one or more of the same predetermined intervals, a determination is made that less than all of the plurality of utility usage nodes are connected to the utility distribution node. Another aspect of embodiments of the invention involves identifying at least one of the plurality of utility usage nodes that is not connected to the utility distribution node by comparing utility usage according to usage data from that particular one of the plurality of utility usage nodes to an amount by which utility according to the aggregate usage data from all of the plurality of utility usage nodes exceeds utility distribution according to the distribution data from the utility distribution node during the same predetermined interval or intervals.

The knowledge of transformer load in conjunction with individual customer load data will facilitate connection decisions and changes when, for example, certain customers suddenly do have or are expected to have increased load requirements. The transformers have limited capacity and as the need or desire to use electric power increases, e.g., for electric cars, utility companies will need to rearrange connections to redistribute loads and avoid outages or plan for transformer upgrades. Embodiments of the present invention provide a mapping and information solution that gives utility companies the ability to manage loads and equipment and to provide electric services more efficiently and effectively.

In a preferred embodiment, the present invention is implemented using data from wireless meters to pull back the interval data wirelessly from the customer meters as well as the transformer meters. These devices must have relatively accurate (better than a few minutes) time synchronization to enable accurate correlation of the interval data from the various meters. Identically assigned U.S. patent application Ser. No. 12/275,242 entitled "Collector Device and System Utilizing Standardized Utility Metering Protocol" details various exemplary embodiments for facilitating the pull or push of use data from or to meter nodes. The entirety of this application is incorporated herein by reference.

The simplified example described herein could be expanded in operation, wherein an algorithm implemented on an appropriate processor or processors takes into account the physical proximity of numerous meters to a particular transformer—for example looking at the 100 closest meters to a transformer—to determine which of those meters must be connected to the transformer to create the measured load profile (i.e., trying different combinations of the 100 closest meters until the closest match to the measured load profile is determined). This operation can be performed on demand or as part of a continuous monitoring process. The operation can be utilized as part of a baseline mapping process and/or as part of a mapping validation or map database updating process.

In a similar fashion, customer interval meter data that has been related to a transformer can be further aggregated by assumed phase connections of the transformers up to a common measurement point (i.e. substation bank, circuit breaker, line capacitor, circuit recloser, circuit switch, or any other phase connected device equipped with measurement equipment). For example, all of the customer interval meter data could be further aggregated and compared to the outflow from a substation to determine where gaps of losses may exist. The transformer loads and then the house meters should sum up to the electricity that leaves the substation and if not, a loss exists which can then be isolated. In this manner, the utility can diagnose where equipment may have been incorrectly connected (or reconnected after a storm restoration) to the distribution phase to which the load was originally allocated. By providing guidance, the utility field crews can more efficiently and effectively balance the phase loading of the circuit. A balanced distribution circuit then results in more efficient operation, lower system losses, and lower neutral current that may lead to stray voltage or "tingle" shock.

Finally, many utilities make regular movement of portions of the distribution circuit to other circuits, to other substations, and in some cases to other utilities by opening and closing switching points. With the afore described correlation of synchronized interval data for embodiments of the invention, utilities will use a common measurement point (i.e. substation bank, circuit breaker, line capacitor, circuit recloser, circuit switch, or any other phase-connected device equipped with measurement equipment) and the data from all meter points on the switched portion of a circuit to interpolate whether the portion of the circuit has been switched back, remains switched, or is shared between both circuits. Sharing the circuits may be unintentional and could lead to a catastrophic failure of equipment under certain circumstances and subject personnel to hazards if the system is assumed to be switched.

As data is aggregated higher into the utility system from meter up to substation, the fidelity of the analysis may become questionable. However, embodiments of the present invention, using assumptions and inputs from a multitude of devices as described on the distribution network, will provide the utility with guidance to make more informed decisions for the use of assets and personnel. Embodiments of the current invention enable a utility company to map power connections at the most basic level, i.e., pole or pad transformer. Embodiments of this invention will provide utilities with better knowledge of the assets within a geographic region between the substation to the meters.

The words "herein," "above," "below," and words of similar import, when used in this application, shall refer to this application as a whole and not to any particular portions of this application. Where the context permits, words in the above detailed description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Further any specific numbers noted herein are only examples: alternative implementations may employ differing values or ranges. The teachings of the invention provided herein can be applied to other processes, devices and systems, not necessarily the processes, devices and systems described above. The elements and acts of the various embodiments described above can be combined to provide further embodiments.

While the above detailed description describes certain embodiments of the invention, and describes the best mode contemplated, no matter how detailed the above appears in text, the invention can be practiced in many ways. Details of the processes, devices and systems may vary considerably in their implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above detailed description section explicitly defines such terms. Accordingly, the actual scope of the invention encompasses not only the disclosed embodiments, but also all equivalent ways of practicing or implementing the invention under the claims.

The invention claimed is:

1. A process for mapping usage data from a plurality of utility usage nodes to at least one utility distribution node comprising:
   collecting, at a collection device, utility usage data from the plurality of utility usage nodes at predetermined intervals;
   collecting, at the collection device, utility distribution data from the at least one utility distribution node at the predetermined intervals; and
   determining, using a computer, which of the plurality of utility usage nodes is connected to the at least one utility distribution node by comparing aggregate usage data from one or more of the plurality of utility usage nodes to distribution data from the at least one utility distribution node during at least one same predetermined interval.

2. The process of claim 1, wherein the plurality of utility usage nodes further comprise a plurality of utility usage nodes selected from a group consisting of a plurality of electricity usage nodes, a plurality of water usage nodes, and a plurality of gas usage nodes.

3. The process of claim 1, wherein the predetermined intervals further comprise predetermined intervals of at least one minute.

4. The process of claim 1, wherein the predetermined intervals further comprise predetermined intervals of up to one hour.

5. The process of claim 1, wherein the predetermined intervals further comprise predetermined intervals of between at least one minute and up to one hour.

6. The process of claim 1, wherein the plurality of utility usage nodes further comprise a plurality of electricity usage meters.

7. The process of claim 6, wherein collecting, at the collection device, the utility usage data from the plurality of utility usage nodes further comprises collecting, at the collection device, the utility usage data from the plurality of utility usage meters over a wireless network.

8. The process of claim 6, wherein collecting, at the collection device, the utility usage data from the plurality of utility usage nodes further comprises collecting, at the collection device, the utility usage data from the plurality of utility usage meters over a wired network.

9. The process of claim 6, wherein the plurality of utility usage meters are time synchronized with one another.

10. The process of claim 1, wherein the at least one utility distribution node further comprises at least one utility distribution node selected from a group consisting of at least one electricity distribution node, at least one water distribution node, and at least one gas distribution node.

11. The process of claim 1, wherein the at least one utility distribution node further comprises at least one transformer.

12. The process of claim 11, wherein said at least one transformer further comprises at least one transformer load meter.

13. The process of claim 12, wherein collecting, at the collection device, utility distribution data from the at least one utility distribution node further comprises collecting, at the collection device, load meter data from the at least one transformer load meter over a wireless network.

14. The process of claim 12, wherein collecting, at the collection device, utility distribution data from the at least one utility distribution node further comprises collecting, at the collection device, load meter data from the at least one transformer load meter over a wired network.

15. The process of claim 12, wherein the plurality of utility usage nodes further comprise a plurality of electricity usage meters that are time synchronized with one another and with the at least one transformer load meter.

16. The process of claim 1, wherein the at least one utility distribution node further comprises at least one of a substation bank, a circuit breaker, a line capacitor, a circuit recloser, or a circuit switch.

17. The process of claim 1, wherein determining which of the plurality of utility usage nodes is connected to the at least one utility distribution node further comprises determining that all of the plurality of utility usage nodes are connected to the at least one utility distribution node when utility usage according to the aggregate usage data from all of the plurality of utility usage nodes is substantially equal to utility distribution according to the distribution data from the at least one utility distribution node during the at least one same predetermined interval.

18. The process of claim 1, wherein determining which of the plurality of utility usage nodes is connected to the at least one utility distribution node further comprises determining that a condition of unallocated consumption exists for the at least one utility distribution node when utility usage according to the aggregate usage data from all of the plurality of utility usage nodes is less than the utility distribution according to the distribution data from the at least one utility distribution node during the at least one same predetermined interval.

19. The process of claim 18, wherein determining that a condition of unallocated consumption exists further comprises determining that a non-technical line loss exists for the at least one utility distribution node when utility usage according to the aggregate usage data from all of the plurality of utility usage nodes is less than the utility distribution according to the distribution data from the at least one utility distribution node during the at least one same predetermined interval.

20. The process of claim 18, wherein determining that a condition of unallocated consumption exists further comprises determining that at least one additional utility usage node is connected to the at least one utility distribution node when the utility usage according to the aggregate usage data from all of the plurality of utility usage nodes is less than the utility distribution according to the distribution data from the at least one utility distribution node during the at least one same predetermined interval.

21. The process of claim 20, wherein determining that at least one additional utility usage node is connected to the at least one utility distribution node further comprises identifying the at least one additional node by comparing utility usage according to usage data from said at least one additional utility usage node to an amount by which the utility usage according to the aggregate usage data from the plurality of utility usage nodes is less than the utility distribution according to the distribution data from the at least one utility distribution node during the at least one same predetermined interval.

22. The process of claim 1, wherein determining which of the plurality of utility usage nodes is connected to the at least one utility distribution node further comprises determining that less than all of the plurality of utility usage nodes are connected to the at least one utility distribution node when utility usage according to the aggregate usage data from all of the plurality of utility usage nodes exceeds the utility distribution according to the distribution data from the at least one utility distribution node during the at least one same predetermined interval.

23. The process of claim 22, wherein determining that less than all of the plurality of utility usage nodes are connected to the at least one utility distribution node further comprises identifying at least one of the plurality of utility usage nodes that is not connected to the at least one utility distribution node by comparing utility usage according to usage data from said at least one of the plurality of utility usage nodes to an amount by which utility according to the aggregate usage data from all of the plurality of utility usage nodes exceeds utility distribution according to the distribution data from the at least one utility distribution node during the at least one same predetermined interval.

24. A machine for mapping usage data from a plurality of utility usage nodes to at least one utility distribution node comprising:
   a microprocessor coupled to a memory, wherein the microprocessor is programmed to:
      receive utility usage data collected, at a collection device, from the plurality of utility usage nodes at predetermined intervals;
      receive utility distribution data collected, at the collection device, from the at least one utility distribution node at the predetermined intervals; and
      determine which of the plurality of utility usage nodes is connected to the at least one utility distribution node by comparing aggregate usage data from one or more of the plurality of utility usage nodes to distribution data from the at least one utility distribution node during at least one same predetermined interval.

25. A non-transitory computer-readable storage medium with an executable program stored therein, wherein the program instructs a microprocessor to perform the following steps:
   receiving utility usage data collected, at a collection device, from the plurality of utility usage nodes at predetermined intervals;
   receiving utility distribution data collected, at the collection device, from the at least one utility distribution node at the predetermined intervals; and
   determining which of the plurality of utility usage nodes is connected to the at least one utility distribution node by comparing aggregate usage data from one or more of the plurality of utility usage nodes to distribution data from the at least one utility distribution node during at least one same predetermined interval.

* * * * *